United States Patent [19]

Konik

[11] Patent Number: 5,193,259

[45] Date of Patent: Mar. 16, 1993

[54] TOOL FOR MANIPULATING AN OPTICAL FIBER SPLICING DEVICE

[75] Inventor: Walter S. Konik, Lilburn, Ga.

[73] Assignee: AT&T Bell Laboratories, Murray Hill, N.J.

[21] Appl. No.: 811,152

[22] Filed: Dec. 19, 1991

[51] Int. Cl.⁵ .............................................. B23P 19/04
[52] U.S. Cl. ...................................................... 29/267
[58] Field of Search ................. 29/758, 239, 270, 271, 29/267, 278, 280, 281.5, 282, 225

[56] References Cited

U.S. PATENT DOCUMENTS

| | | | |
|---|---|---|---|
| 2,594,789 | 4/1952 | Morin | 29/239 |
| 3,997,957 | 12/1976 | Tone et al. | 29/239 |
| 4,443,001 | 4/1984 | Haerer | 29/239 |
| 4,866,838 | 9/1989 | Porter | 29/758 |

*Primary Examiner*—Robert C. Watson
*Attorney, Agent, or Firm*—D. E. Hayes, Jr.

[57] ABSTRACT

A tool (20) for manipulating an optical fiber splicing device (28) so as to release the fiber ends (30—30) from the splicing device (28) in a manner which allows the same splicing device (28) to be used more than once. The tool (20) includes a body section (22), a spring and lever assembly section (24) and a splice holding and manipulating section (26). The splice holding and manipulating section (26) provides means to hold the splicing (28) to the body section (22) of tool (20). In addition, this section (26) comprises a series of tapered prongs (92) which are aligned so that each prong may be wedged between a housing (82) of the splicing device (28) and a latching mechanism (88) of the splicing device (28). The spring and lever assembly section (24) interacts with the splice holding and manipulating section (26) to control the motion of the tapered prongs (92). The mechanical operation of section (24) is relatively similar to that of the motion control mechanism used in fingernail clippers.

5 Claims, 2 Drawing Sheets

TOOL FOR MANIPULATING AN OPTICAL FIBER SPLICING DEVICE

TECHNICAL FIELD

This invention relates to a tool for manipulating an optical fiber splicing device. More particularly, the invention relates to a tool which makes certain types of optical fiber splicing devices reusable by providing means to reposition a retention spring of the splicing device to an open position, thereby permitting fibers to be reoriented or removed for recleaving.

BACKGROUND OF THE INVENTION

Optical fiber connectors and splicing devices are an important part of substantially any optical fiber communication system. For instance, connectors or splicing devices may be used to join segments of fiber into longer lengths or to connect fiber to active devices such as radiation sources, detectors, or repeaters, or to passive devices such as switches or attenuators. Considering that a core of multimode optical fiber is 50 microns in diameter and that of single mode fiber is only 8 microns, achieving a proper connection or splice is no small task.

A particular optical fiber splicing device is disclosed in commonly-assigned U.S. patent application Ser. No. 682,888 filed on Apr. 8, 1991, in the names of Aberson, et al., and which is assigned to the assignee of the instant application. The above-referenced patent application discloses an optical fiber splicing device which is described as a cleave, sleeve and leave-type (CSL) splicing device. In this particular splicing device, end portions of two optical fibers are caused to be disposed in a capillary tube with the center transmitting portions of the fiber exposed. A flexible metallic retention spring member, located in the center of the capillary tube, is folded over the spliced end portions to retain the spliced portions in engagement with each other. The connection is achieved while generating only minimal losses, thereby obviating the need for expensive precision alignment apparatus. Furthermore, the mechanical optical fiber splicing device disclosed in the above-referenced patent application does not require the involvement of curable material and allows visual inspection of the spliced end of the optical fibers.

Notwithstanding the benefits of existing optical fiber splicing devices, and specifically the particular splicing device described above, a tool which would allow any of the splicing devices to be reusable would be of considerable importance. At present, optical fiber splice connections are intentionally made to be permanent. However, due to various environmental and operational factors which may develop over time, there often exists a need to resplice some junctions within an optical fiber communication system. Unfortunately, a deficiency of the existing optical fiber splicing devices is that they generally are constructed so as to be capable of only one use. Therefore, a splicing device with a damaged or inadequate splice must be completely discarded and replaced with a new splicing device to correct any problems.

There are a variety of different reasons that an optical fiber splice connection may need to be replaced or reoriented. Many times, when the alignment or orientation of the spliced fibers are adversely affected, the loss associated with that junction becomes unacceptably high. Occasionally high splice losses may be caused by fiber eccentricity, poor cleave angles or improper splice assembly.

In view of the considerable expense and inconvenience caused by having to remove and replace any defective splice, regardless of the type or severity of damage, the search for a system which allows an optical fiber splicing device to be reenterable or reusable has continued. Sought after is a tool which may be used in association with existing splicing devices to enable certain types of problems which frequently occur with fiber splices to be correctable without having to discard the previously used splicing device. Also, the sought-after splice reentry tool should be relatively simple and easily operable in the field as well as rugged. Further, the sought-after means for achieving reusable splicing devices should be capable of working in association with existing splicing devices so as to not require special new equipment to resplice the fibers after the defects have been corrected.

What is desired and seemingly what is not available in the prior art is a relatively low cost tool means for allowing certain types of optical fiber splicing devices to be reenterable or reusable. The sought-after splice reentry tool should be one which is simplistic in structure, yet one which provides a reliable means for disengaging previously secured optical fiber splice connections in a manner which allows that optical fiber splicing connector to be reused.

SUMMARY OF THE INVENTION

The foregoing problems of the prior art have been overcome with the tool of the present invention for manipulating an optical fiber splicing device. As a matter of reference, the tool of the present invention is also referred to herein as a splice reentry tool. This tool utilizes a series of tapered prongs to controllably disengage a secured optical fiber splicing device from spliced fiber ends in a manner that allows the splicing device to be used more than once.

A tool in accordance with this invention generally includes a body section and a splicing device holding and manipulating section which is operative to maintain the splicing device in a desired position relative to the body section of the tool. In addition, the splice holding and manipulating section is capable of manipulating the splicing device so as to disengage a latching mechanism within the splicing device. Furthermore, the present invention includes a spring and lever assembly section in physical connection with the splice holding and manipulating section for allowing manual control over the particular motion which actually disengages the latching mechanism.

In a preferred embodiment of the present invention, the splice holding and manipulating section includes a series of tapered prongs which are aligned adjacent to each end of the latching mechanism. The series of tapered prongs includes two pairs of prongs positioned so that the narrow end of each tapered prong points toward the narrow end of the other prong of that pair. The tapered prongs are oriented in the above described alignment so that the spring and lever assembly section can apply a force which causes the prongs of each pair of prongs to be directed toward one another. As the prongs come together, they are wedged between the latching mechanism and the housing of the splicing device in a manner that causes the latching mechanism to become spaced from the optical fiber ends positioned in the splicing device. Such movement of the latching mechanism releases a pressure previously being applied to secure the splice between the two optical fiber ends. Therefore, by removing the force applied to the fiber end portions, the splicing device is opened thereby allowing the fiber ends to be reoriented or removed for recleaving.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
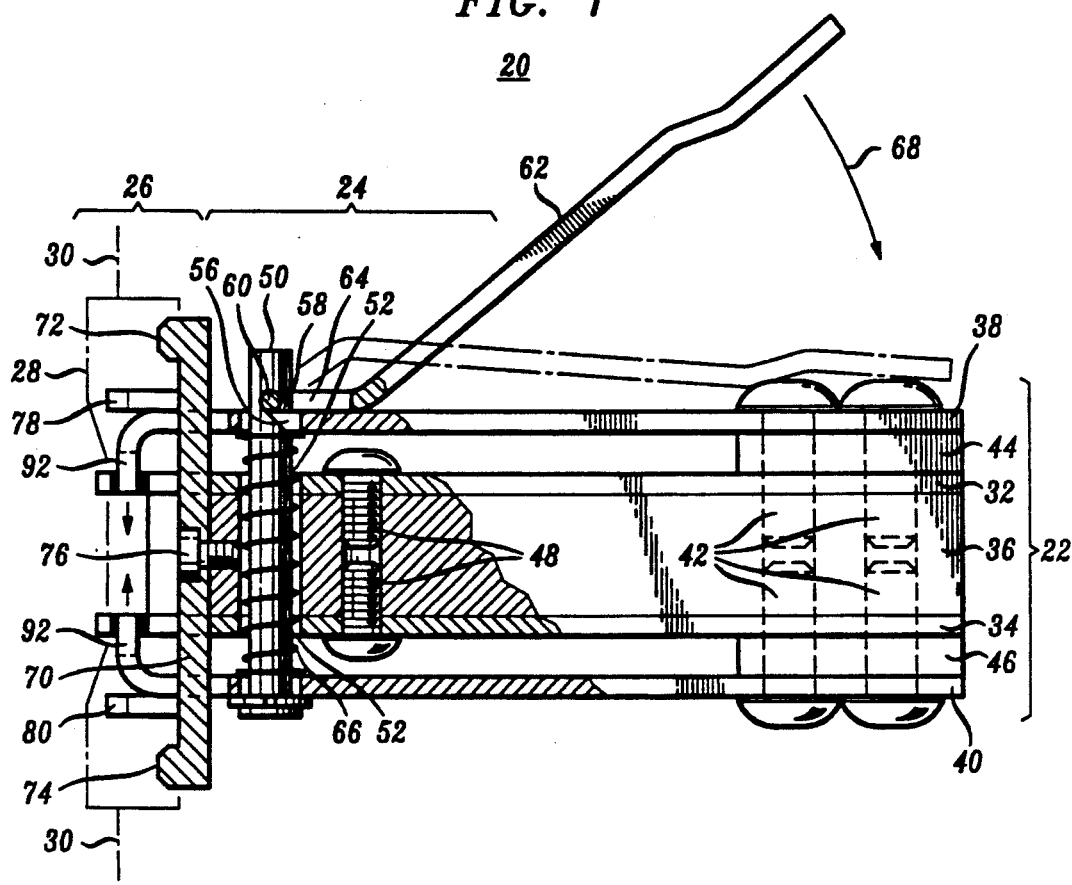
FIG. 1 is an elevational view, partially in section, of the tool of the present invention for manupulating an optical fiber splicing device.

There is shown in FIG. 1 a tool, which is designated generally by numeral 20, for manipulating an optical fiber splicing device. The optical fiber splice reentry tool 20 includes three general sections. These sections include a body section 22, a spring and lever assembly section 24 and a splice holding and manipulating section 26.

In addition to depicting each of the general sections of the reentry tool 20, FIG. 1 shows in phantom, an optical fiber splicing device 28, with associated optical fiber ends 30—30, properly positioned within the splice holding and manipulating section 26 of tool 20. When positioned as shown in phantom, the splicing device 28 may be manipulated to release the optical fiber ends 30—30 to allow one or both ends to be reoriented or removed for recleaving. After the fiber ends 30—30 have been reoriented or treated as desired, the splicing device 28 is once again securely closed to resplice the two end portions 30—30 of the optical fibers as disclosed in the previously referenced patent application which is expressly incorporated by reference herein.

In the preferred embodiment of the present invention, the body section 22 of reentry tool 20 generally comprises four bars 32, 34, 38 and 40, each having a rectangular cross-section and aligned parallel to one another. The two innermost positioned bars 32 and 34 are continually separated by a midsection portion 36 which runs the length of inner bars 32 and 34. The two outermost positioned bars 38 and 40 are securely fastened to the two inner bars 32 and 34 and the midsection portion 36 via fastening means 42. The fastening means 42 are preferably positioned at the back end of the tool 20 or, in other words, the end of the bars 32, 34, 38 and 40 farthest removed from the splice holding and manipulating section 26, which will be discussed in more detail below.

In addition, spacers 44 and 46 are used to maintain an adequate degree of spacing between the outer bars 38 and 40 and the inner bars 32 and 34. The spacers 44 and 46 are positioned at the back end of the tool 20 around fastening means 42 between the outer bars 38 and 40 and their most closely aligned inner bars 32 and 34 as shown in FIG. 1. It should be noted that while bolts are the particular type of fastening means illustrated in FIG. 1, any well known type of mechanism for securing is acceptable and deemed to be within the scope of the present invention.

The inner bars 32 and 34 are provided with additional securing means 48 for attaching the front ends of inner bars 32 and 34 to midsection portion 36. This additional securing means 48 is located near the spring and lever assembly section 24 of the reentry tool 20 and causes no interference with the motion of the portions of outer bars 38 and 40 which are closely aligned with additional securing means 48.

As shown in FIG. 1, the spring and lever assembly section 24 of reentry tool 20 is located near the front end of the tool. This section 24 provides the capability of manipulating manually the front end of two outer bars 38 and 40 so as to force the front end portion of outer bars to come closer together. The spring and lever assembly 24 comprises a rivet or pin 50 which has its lower end secured to outer bar 40. The pin 50 extends through inner bars 32 and 34 as well as midsection portion 36 via aligned apertures 52. The pin 50 protrudes through outer bar 38 via opening 54 to a distance above the outer bar 38 as shown in FIG. 1.

As stated earlier, the spring and lever assembly section 24 of the present tool 20 provides manual control over the motion of the front end of outer bars 38 and 40 relative to each other. To assist in facilitating such motion control of the outer bars, the pin 50 is adapted on one side with a curved transverse recess or notch 56. The transverse notch 56 is provided at its top with an inverted curved hook portion 58 in which is seated a transverse bar 60 located at one end of an operating lever 62. The transverse bar 60 is provided by cutting an opening 64 in the end of the operating lever 62.

To provide a constant force acting to maintain a desirable separation between the two outer bars 38 and 40, a spring 66 is positioned so as to surround pin 50 and apply an outward pressure against both outer bars 38 and 40. The spring 66 passes through the inner bars 32 and 34 and midsection portion 36 by means of aligned apertures 52, as does pin 50.

The operating lever 62 is constructed so that it includes a relatively sharp bend near the transverse bar 60 and opening 64. The operating lever 62 extends beyond the bend to an overall length substantially equal to the length of outer bars 38 and 40 as shown in FIG. 1.

The pin 50 is attached to outer bar 40 in a manner that allows it to swivel or rotate within aligned apertures 52. By utilizing the swivel capabilities of the pin 50 and its interconnection with operating lever 62, the lever 62 may be configured in two different positions. The first position is referred to herein as the inoperative position and is also illustrated in phantom in FIG. 1. This inoperative position involves the bend within lever 62 to be slightly removed from the outer bar 38 thereby allowing the free end of lever 62 to be placed immediately adjacent to the back end of tool body section 22. When in the inoperative position, the lever 62 is aligned substantially parallel and adjacent to outer bar 38.

The second position for lever 62 is the operating position and is illustrated in FIG. 1. The operating position aligns the opening 64 and the bend of lever 62 immediately adjacent to outer bar 38. Such an alignment causes the longer portion of lever 62 to extend at an angle outwardly from the tool body section 22. The particular angle of the lever 62 relative to the body section 22 of the tool 20 is directly related to the angle of the bend located in the end of the lever connectable to pin 50. In the preferred embodiment of the present invention, the longer portion of lever 62 extends outward at an angle of approximately forty-five degrees (45°) relative to outer bar 38.

The particular range of motion encountered in moving the lever 62 between the two positions is substantially identical to the operation of the common fingernail or toenail clippers presently available. Therefore, no more details concerning the specific mechanical involvement of the parts common to the known clippers and the present invention will be discussed herein.

The specific operation of the reentry tool 20 as an optical fiber splice manipulating device will now be discussed in greater detail. First, with the lever 62 arranged in its operating position, the edge of the bend of lever 62 provides a fulcrum point against the outer bar 38 due to the physical orientation of the bend relative to the outer bar 38. Therefore, when pressure is applied to the free end of lever 62 in a direction indicated by arrow 68, the force is converted such that the end portions of the two outer bars 38 and 40 are directed towards each other in opposition to the outward causes exerted by spring 66.

The previously described motion of the outer bars 38 and 40 initiates the involvement of the third section of the reentry tool 20 of the present invention. The third section of the tool 20 is referred to herein as the splice holding and manipulating section and is generally designated by element 26 of FIG. 1. The main objective of the individual components of this section 26 is to hold the optical fiber splicing device in the required orientation to allow the particular latching mechanism used to hold the fiber ends 30—30 spliced together to be released.

The splice holding and manipulating section 26 utilized in the preferred embodiment of the present invention includes a back-plate 70. The back-plate 70 is specifically configured to accept the optical fiber splicing device 28 in a manner that will securely support and hold the splicing device 28 in its desired position and orientation. To assist in achieving this objective, the back-plate 70 of the present invention has two protrusions 72 and 74 which extend outwardly from each end of plate 70 away from the body section 22 of tool 20.

The protrusions 72 and 74 are separated by a distance which corresponds to the distance between receiving notches (not shown) present on the optical fiber splicing device 28. Due to the complimentary configuration between the protrusions 72 and 74 and the notches, the protrusions 72 and 74 act to prevent movement of the splicing device 28 in a direction along the length of back-plate 70. In addition to the protrusions 72 and 74, the back-plate 70 is further adapted to provide means to prohibit the splicing device 28 from moving in a direction across the width of back-plate 70. In particular, two pairs of extensions 78 and 80 project outward from either side of back-plate 70 as shown in FIG. 1.

Figure 2:
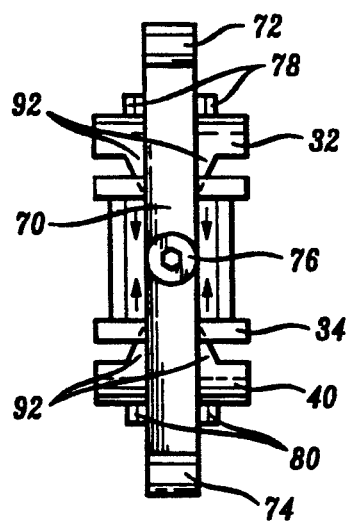
FIG. 2 is an end view of the tool of FIG. 1.

In the preferred embodiment of the present invention, the back-plate 70 is centrally mounted to the front side of midsection portion 36 by fastening means 76 so that the length of the back-plate 70 is aligned parallel with pin 50, as shown in FIG. 1. Specifically, the back-plate 70 is mounted such that a portion of both the inner bars 32 and 34 and the outer bars 38 and 40 in addition to the pairs of extensions 78 and 80, extend beyond each side of the back-plate 70. By securing the back-plate 70 to the midsection portion 36 as described herein, a trough or channel (see FIG. 3) is created along the back-plate 70. The sides of the trough are comprised of portions of inner bars 32 and 34, upper portions of midsection portion 36, as well as the two pairs of extensions 78 and 80, due to the projection of each of these components beyond the back-plate 70. As stated earlier, FIG. 1 illustrates in phantom the physical orientation of the splicing device 28 when properly positioned in the trough or channel of the tool 20 of the present invention. FIG. 2 depicts on end view of the splice reentry tool of the present invention.

Figure 3:
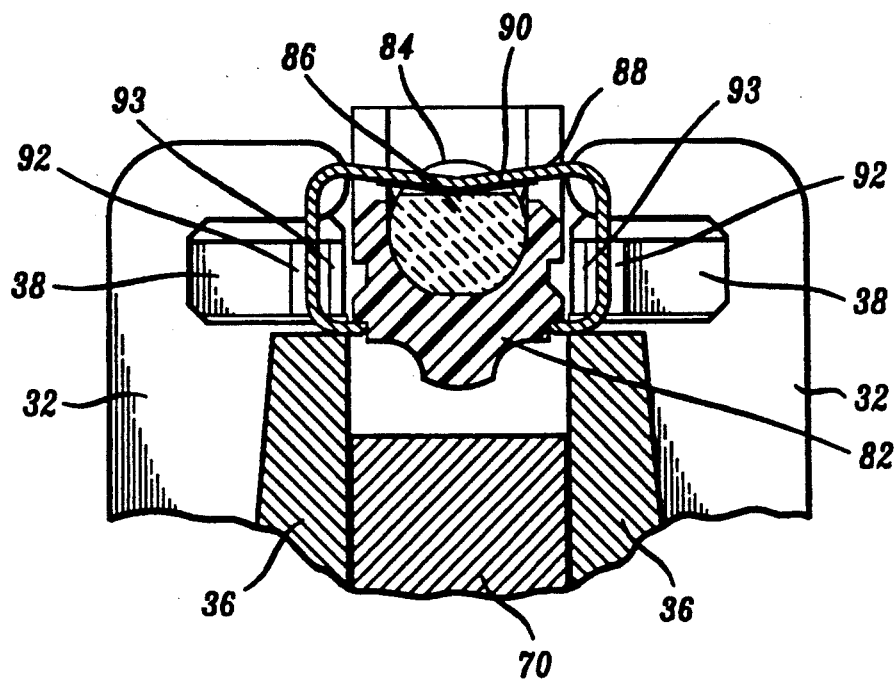
FIG. 3 is an end view in section of the tool in operational conjunction with the spring clip of an optical fiber splicing device immediately prior to the splicing device being manipulated for reentry or reuse by the tool of the present invention.

In general, the splicing device 28 to which the preferred embodiment of the present invention is especially directed comprises three components. FIG. 3 illustrates in cross-section each of these three components as they are arranged when the tool 20 is operative to disengage a previously created fiber splice. The first component is a clear plastic housing 82 with a lens molded into it to allow visual observation of the optical fibers 30—30 during the splicing procedure. Funnel openings at each end of the housing are specifically designed to allow easy insertion of the fibers and to provide bending strain relief to the fibers 30—30.

The second component of splicing device 28 to which the present invention is adapted is a glass capillary tube 84 which is prefilled with an index matching material 86. Although a variety of products may be acceptable for use as the glass capillary tube 84, PYREX ® glass is the preferred material. The particular matching material 86 should have virtually the same refractive index as the optical fiber being spliced, have a relatively unlimited shelf life, be optically clear at all wavelengths and not require curing. In particular, the capillary tube 84 has an eccentric or offset bore to enhance strength and an approximately 0.4 inch exposed section to help eliminate any effects of fiber pistoning. As stated earlier, funnel openings are located in each end of the device 28 to assist in guiding the fiber ends 30—30 into the bore.

The third component of the particular type of optical fiber splicing device 28 of interest is a metal retention spring clip 88. The metal spring clip 88 is movable so as to engage and disengage the fiber ends 30—30. When physically engaged, the spring clip 88 latches the fiber ends 30—30 into physical contact with each other in a manner that creates an acceptable communication link between the two fibers. In addition, the spring clip 88 preferably provides a strength capability of more than one-pound pullouts on the fibers. Affixed to the inside of the spring clip 88 is a thin, compliant member 90 which accommodates a variety of different outside diameters of the particular type of fibers being spliced. In addition, the compliant member 90 assists in sealing the splice interface from water intrusion as well as provides protection for the fiber from direct physical contact with the generally metallic surface of the spring clip 88.

Figure 4:
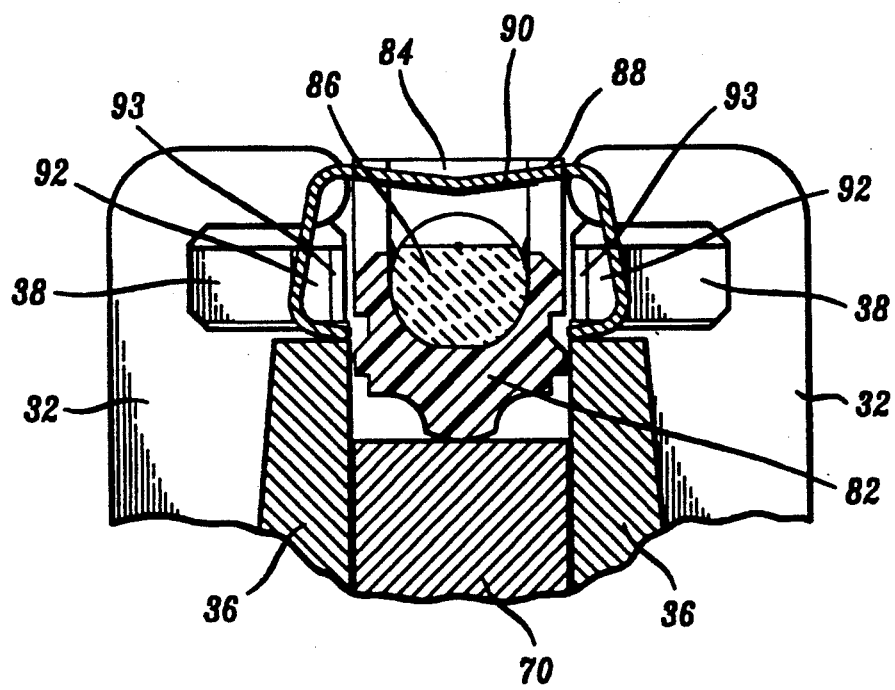
FIG. 4 is an end view in section of the tool in operational conjunction with the spring clip of an optical fiber splicing device with the splicing device having been manipulated for reentry or reuse by the tool of the present invention.

FIG. 3 depicts the tool 20 of the present invention in operational conjunction with a splicing device 28 which is in its closed position, therefore securely splicing two fiber ends together. FIG. 4 depicts the tool 20 of the present invention during operation as the tapered prongs 92 are inserted between the latching mechanism and the housing thus opening the splicing device 28. Once the splicing device is in its opened position, the splicing device 28 is disengaged from the spring clip 88 and drops to the bottom of the previously described trough.

Turning now to the specific operation of the tool 20 of the present invention to physically reposition the retention spring clip 88 to the open position thereby permitting the fiber ends 30—30 to be reoriented or removed from the splice for recleaving. To facilitate the operation of the present tool 20, a previously secured fiber splicing device 28 is positioned in the tool 20 as shown in FIG. 1, FIG. 3 and FIG. 4. As illustrated, the proper orientation of the tool is such that the retention spring clip 88 of the splicing device 28 is facing up and arranged in the trough as previously described.

To activate the operation of the present tool 20, the free end of lever 62 is configured in the operating position. The lever 62 is then manually forced toward the tool body part 22 as indicated by arrow 68 of FIG. 1. As stated above, the motion of lever 62 toward outer bar 38 forces the front end of outer bars 38 and 40 to move towards each other. Due to the unique configuration of tool 20 of the present invention and its specific physical relationship with various types of optical fiber splicing devices 28, such motion by the outer bars 38 and 40 establishes a physical interaction between the splice holding and manipulating section 26 of the present tool 20 and the retention spring clip 88 of the splicing device 28. The particular mechanical involvement between section 26 of the tool 20 and the spring clip 88 is discussed in greater detail immediately below.

In the preferred embodiment of the present invention, the front ends of both outer bars 38 and 40 are particularly configured so as to extend a distance beyond back-plate 70. The manner in which the front ends of the outer bars extend beyond plate 70 is similar to the way the inner bars 32 and 34 extend beyond plate 70. Therefore, portions of the front ends of outer bars 38 and 40 act in conjunction with portions of inner bars 32 and 34 and extensions 78 and 80 to produce sides to the trough in which the optical fiber splicing device 28 is positioned.

In addition to the physical alignment of the front ends of outer bars 38 and 40, each side portion of the outer bars which extend beyond plate 70 are bent inward toward the inner bars 32 and 34. Furthermore, the bent section of the outer bars 38 and 40 are aligned parallel to back-plate 70 and are constructed so as to exhibit a series of tapered prongs 92. The series of tapered prongs 92 includes two pairs of prongs positioned so that a narrow end 93 of each tapered prong 92 points toward the narrow end 93 of the other prong of that pair. When an optical fiber splicing device 28 is properly positioned in tool 20, the tapered prongs 92 are positioned immediately adjacent to each side of housing 82 at a position just outside an end of the retention spring clip 88. Therefore, when the two outer bars 38 and 40 are moved toward each other, each of the tapered prongs 92 of each pair are wedged between spring clip 88 and an upper portion of housing 82 as shown in FIG. 4.

As the prongs 92 are eased between the housing 82 and clip 88, the clip 88 is widened due to the particular configuration and the tapered configuration of prongs 92. As the spring clip 88 is widened, it becomes disengaged from the the fiber ends 30—30. As stated earlier, when in the engaged position the force of retention spring clip 88 acts to hold the two fiber ends 30—30 in spliced connective relationship and thereby secure and maintain a proper splice. Once the force previously being applied to the fiber ends 30—30 by the spring clip 88 is removed, one or both of the fiber ends may be reoriented or removed from the splicing device 28 for recleaving. As a result of the disengagement of the spring clip 88, the splicing device may be said to be opened. The particular motion and securing of spring claip 88 is discussed in greater detail in the previously mentioned patent application.

After the previous splice connection has been opened and the fiber ends 30—30 reoriented or modified as desired, commonly used splicing means may be used to resecure the fiber ends. Since the splicing device 28 is not damaged by the opening procedure performed by tool 20 of the present invention, the previously used splicing device 28 may be reused a number of times. Such ability for repetitive uses alleviates the need to completely discard a particular splicing device whenever any problem is detected with an existing splice. The tool 20 of the present invention allows the splice to be opened to correct any fiber alignment problems by reorienting the fiber ends 30—30 or correct other various defects that commonly exist in optical fiber splices.

It is to be understood that the above-described arrangements are simply illustrative of the invention. Other arrangements may be devised by those skilled in the art which will embody the principles of the invention and fall within the spirit and scope thereof.

I claim:

1. A tool for manipulating a latching mechanism which is assembled to a housing of an optical fiber splicing device so as to disengage the latching mechanism from the end portions of two fibers which are spliced together in a capillary tube in the housing in a manner which allows reuse of the splicing device comprising:
   a body portion;
   means for holding the splicing device to the body portion;
   means capable of being controllably moved between the housing and the latching mechanism for causing the latching mechanism within the splicing device to become disengaged from the spliced fiber end portions wherein such disengaging releases the optical fiber splice and for causing the latching mechanism to become disposed in a position so that the splicing device is capable of being reloaded with two optical fibers and reused to secure a new splice between the optical fibers; and
   wherein the disengaging means includes a series of tapered prongs including two pairs of prongs which are parallelly aligned with each other and wherein one prong of each pair of prongs is positioned adjacent to each end of the latching mechanism such that the narrow end of each tapered prong points toward the corresponding prong of that pair.

2. The tool of claim 1 wherein the series of tapered prongs are connected to the body portion by a pair of support extensions which are parallelly aligned with each other.

3. The tool of claim 1 wherein the means for controllably moving the tapered prongs comprises a spring pin and lever arrangement.

4. The tool of claim 3 wherein the spring, pin and lever arrangement comprises:
   a pin connectably positioned between the support extensions secured to the tapered prongs;

a spring positioned around the length of the pin which exerts an outward pressure constantly forcing the support extensions apart; and a lever connectable to one end of the pin in a manner such that movement of the lever applies a force to the support extensions in opposition to the spring, thereby moving the support extensions and each pair of connected tapered prongs toward one another, such motion directing the tapered prongs to wedge the latching mechanism away from the optical fibers positioned in the splicing device.

5. The tool of claim 4 wherein the lever may be rotatably positioned in an operative position where the lever may act to force the support extensions together or an inoperative position where substantially the entire length of the lever is positioned immediately adjacent to one of the support extensions, thereby facilitating compact storage of the tool.

* * * * *